United States Patent [19]

Bruttel et al.

[11] Patent Number: 4,560,747

[45] Date of Patent: Dec. 24, 1985

[54] PROCESS FOR PRODUCING GRANULATES OF WATER-SOLUBLE DYES BY FLUIDIZED BED GRANULATION

[75] Inventors: Beat Bruttel, Böckten; Hansjörg Schneider; Werner H. Dörfel, both of Reinach, all of Switzerland

[73] Assignee: Ciba Geigy Corporation, Ardsley, N.Y.

[21] Appl. No.: 198,885

[22] Filed: Oct. 20, 1980

[30] Foreign Application Priority Data

Oct. 30, 1979 [CH] Switzerland .......... 9702/79

[51] Int. Cl.$^4$ .......... C09B 46/00; D06P 5/02; D06P 1/64
[52] U.S. Cl. .......... 534/887; 8/524; 8/564; 8/582; 8/585; 260/245.70; 260/372; 534/625; 534/636; 534/637; 534/638; 534/643; 534/684; 534/693; 534/696; 534/695; 534/698; 534/700; 534/706; 534/712; 534/722; 544/188
[58] Field of Search .......... 260/208, 372, 245.78; 34/10; 264/117; 534/887, 625, 636, 637, 638, 643, 684, 693, 695, 696, 698, 700, 706, 712, 722; 544/188; 8/564, 582, 585

[56] References Cited

U.S. PATENT DOCUMENTS

| | | | |
|---|---|---|---|
| 3,879,855 | 4/1975 | Weiser et al. .......... | 34/10 |
| 3,880,968 | 4/1975 | Kaspar et al. .......... | 264/37 |
| 4,227,880 | 10/1980 | Hohenegger et al. .......... | 8/524 |

FOREIGN PATENT DOCUMENTS

| | | | |
|---|---|---|---|
| 2616639 | 10/1976 | Fed. Rep. of Germany .......... | 534/887 |
| 1168692 | 10/1969 | United Kingdom .......... | 534/887 |
| 1567734 | 5/1980 | United Kingdom .......... | 534/887 |

*Primary Examiner*—Floyd D. Higel
*Attorney, Agent, or Firm*—Joseph G. Kolodny

[57] ABSTRACT

A process for producing granulates of water-soluble dyes by means of fluidized bed granulation, wherein there is added a granulating auxiliary having a softening point or softening range between 30° and 150° C. and consisting of (a) at least one compound of the formula I $$A-(CH_2CH_2O)_n-H \quad (I)$$

in which A is the group R—O— or

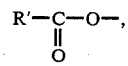

wherein R is an aliphatic or alicyclic hydrocarbon radical having 8 to 22 carbon atoms, R' is an aliphatic hydrocarbon radical having 8 to 22 carbon atoms, and n is 10 to 200, preferably 20 to 150, or (b) a mixture of a compound of the formula II

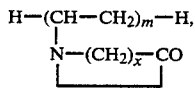

in which m is 50 to 500, and x is 3 to 5, with a compound of the formula III $$R_1-NH-CO-NH-R_1 \quad (III),$$

in which each $R_1$ independently of the other is hydrogen or methyl, or (c) a mixture of a compound of the formula I with at least one compound of the formula II or III.

27 Claims, No Drawings

PROCESS FOR PRODUCING GRANULATES OF WATER-SOLUBLE DYES BY FLUIDIZED BED GRANULATION

The invention relates to a process for producing granulates of water-soluble dyes in a fluidised bed, and to the granulates, as an industrial product, obtained by this process.

The granulation of water-soluble dyes from an aqueous slurry, optionally in the presence of sodium chloride, in a fluidised bed is known from the German Offenlegungsschrift No. 2,716,478; and in the German Offenlegungsschrift No. 2,616,936 is described a process for producing agglomerates of dyes or of optical brighteners by the use of a specific adhesive which softens or melts between 50° and 150° C. It is not however possible to obtain by these processes agglomerates which satisfy practical requirements.

It has now been found that with the addition of specific granulating auxiliaries to a fluidised bed, it is surprisingly possible to granulate therein according to the present invention water-soluble dyes to obtain therefrom granulates which, compared with conventionally produced powders and spray-dried granulate forms, have improved mecanical stability, better flowability, form less dust and have a considerably higher bulk density, combined with good wettability and solubility even in cold water. The granulates are readily dispersible, give stable dispersions and yield level dyeings.

The invention hence relates to a process for producing granulates of water-soluble dyes, in which process at least one granulating auxiliary having a softening point or softening range between 30° and 150° C. and consisting of (a) at least one compound of the formula I

in which A is the group R—O— or

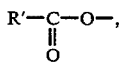

wherein R is an aliphatic or alicyclic hydrocarbon radical having 8 to 22 carbon atoms, R' is an aliphatic hydrocarbon radical having 8 to 22 carbon atoms, and n is 10 to 200, preferably 20 to 150, or (b) a mixture of a compound of the formula II

in which m is 50 to 500, and x is 3 to 5, with a compound of the formula III

in which each $R_1$ independently of the other is hydrogen or methyl, or (c) a mixture of a compound of the formula I with at least one compound of the formula II or III, is sprayed onto a fluidised bed containing at least one water-soluble dye and optionally the granulating auxiliary and/or further additives, the granulating auxiliary or auxiliary mixture being heated, before its addition and/or during the time it is in the fluidised bed, to above its softening point or softening range.

The granulating auxiliary or auxiliary mixture has a softening point or softening range between 30° and 150° C., preferably between 40° and 100° C., and is used in amounts of 5 to 50, preferably 10 to 30, percent by weight, relative to the amount of dye.

In addition to these granulating auxiliaries, other additives can be present, such as in particular diluting agents, in amounts of 0.1 to 50 percent by weight, relative to the dye to be granulated, for example sodium chloride or sodium sulfate; and also wetting agents, dispersing agents and anti-dust agents.

The dye granulates obtained by the process according to the invention likewise form subject matter of the invention.

Suitable water-soluble dyes are for example: acid and basic dyes, such as metal-complex dyes, chrome dyes, developing dyes and mordant dyes, and especially reactive dyes. They are in particular sulfo group- or carboxylic group-containing metal-free or metal-containing and metallisable mono-, dis- and polyazo dyes, formazan dyes, anthraquinone, nitro, methine, acid triphenylmethane, xanthone, naphthazarine, quinophthalone and phthalocyanine dyes; as well as preferably dyes of this type which contain at least one fibre-reactive group in the dye molecule, such as in particular heterocyclic groups or an acyl group of a carboxylic acid, these groups having at least one halogen atom which can be split off under dyeing conditions.

Suitable water-soluble metal-complex dyes are sulfo group- or carboxylic group containing metal-complex dyes, for example 1:1- or 1:2-metal complexes of azo or azo-methine dyes, or metallised phthalocyanines, especially copper and nickel phthalocyanines. The 1:1- and 1:2-metal complexes are preferably 1:1-nickel complexes, 1:1-cobalt complexes, 1:1-copper complexes, 1:1-chromium complexes or 1:1-iron complexes, or symmetrical or asymmetrical 1:2-cobalt complexes, 1:2-iron complexes or 1:2-chromium complexes of in particular o-carboxy-o'-hydroxy-, o-hydroxy-o'-amino- or o,o'-dihydroxyazo dyes of the benzene-azo-benzene-, naphthalene-azo-naphthalene-, benzene-azo-naphthalene, benzene-azo-pyrazolone, benzene-azo-pyridone- or benzene-azo-acetic acid amide type, wherein these groups can be unsubstituted or substituted. Suitable substituents are for example: unsubstituted or substituted sulfonic acid amides or sulfones, halogen or nitro.

The copper and nickel phthalocyanines used according to the invention are derived from the customary mixtures of different sulfonation grades, and preferably contain 2 to 3 or also 4 sulfated sulfonic acid-β- or -γ-hydroxyalkylamide groups; they can in addition however also contain individual halogens and individual sulfonic acid amide groups, these sulfonic acid amide groups being unsubstituted or substituted on the nitrogen atom, for example by lower alkyl, such as methyl, ethyl, propyl or butyl, or by lower hydroxyalkyl groups, such as 2-hydroxyethyl, 2-hydroxypropyl or 3-hydroxypropyl.

In the present process, the azo dyes containing sulfonic acid groups are preferably used in the form of their metal salts, for example potassium or in particular sodium salts. They are preferably water-soluble reactive dyes, especially reactive acid azo or anthraquinone dyes.

Suitable fibre-reactive groups are for example heterocyclic groups or an acyl groups of a carboxylic acid, these groups having at least one halogen atom which can be split off. They are for example the following groups: s-triazinyl groups which carry on the triazine ring one or two halogen atoms, such as chlorine, fluorine or bromine atoms; pyrimidyl groups which carry one to three halogen atoms, such as chlorine and/or fluorine atoms, or one or two arylsulfonyl or alkanesulfonyl groups on the pyrimidine ring; dichloroquinoxylinyl-, 2-chlorobenzothiazolyl or chloroacetylamino groups or $\alpha,\beta$-dibromopropionylamino groups.

Further suitable fibre-reactive groups are for example: halogenocyclobutane, mono- or bis-($\gamma$-halogeno-$\beta$-hydroxypropyl)-amino groups, $\beta$-halogenoethylsulfamide groups, $\beta$-halogenoethoxy groups, $\beta$-halogenethylmercapto groups, $\gamma$-halogeno-$\beta$-hydroxy-propylsulfamide groups, or 2,3-epoxypropyl groups.

The dyes can be optionally also in admixture with each other or optionally with dyes of another type.

The dyes usable according to the invention are known, and can be produced by methods known per se.

Aliphatic hydrocarbon radicals R and R' of the granulating auxiliaries of the formula I are saturated or unsaturated, straight-chain or branched-chain hydrocarbon radicals which are derived from aliphatic alcohols and acids having 8 to 22, preferably 8 to 20, carbon atoms.

Alicyclic hydrocarbon radicals R are in particular polycyclic radicals of alicyclic alcohols, such as hydroabietyl alcohol.

Compounds of the formula I in which A is the group R—O— are reaction products from 10 to 200, preferably 20 to 150 mols of ethylene oxide with higher alcohols having 8 to 22 carbon atoms, such as decyl, lauryl, tridecyl, myristyl, cetyl, stearyl, oleyl, arachidyl or behenyl alcohol; especially reaction products from 35 to 80 mols of ethylene oxide with higher alcohols, for example straight-chain, saturated or unsaturated alcohols having 18 carbon atoms, such as the reaction product from oleyl alcohol and 80 mols of ethylene oxide, or from stearyl alcohol and 35 mols of ethylene oxide; also reaction products from alicyclic alcohols with 80 to 120 mols of ethylene oxide, such as hydroabietyl alcohol etherified with 100 mols of ethylene oxide.

Compounds of the formula I in which A is the group

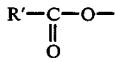

are reaction products from 10 to 200 mols, preferably 20 to 150 mols, of ethylene oxide with straight-chain aliphatic acids, such as fatty acids, for example: caprylic, capric, lauric, myristic, palmitic, stearic, arachic, behenic, coconut oil-($C_8$–$C_{18}$), decenic, dodecenic, tetradecenic, hexadecenic, oleic, linoleic, linolenic, ricinoleic, eikosenic, dokosenic or clupanodonic acid; particularly the condensation product from oleic acid and 20 mols of ethylene oxide.

Compounds of the formula II are in particular polyvinylcaprolactam or preferably polyvinylpyrrolidones having a molecular weight of up to about 40,000, and compounds of the formula III are urea and N,N'-dimethylurea.

As granulating auxiliaries usable according to the invention, there are advantageously used compounds of the formula I on their own or in admixture with a different compound of the formula I, or with a compound of the formula II or III, or a mixture of a compound of the formula II with a compound of the formula III. These mixtures are of particular interest when they are eutectic mixtures, the softening point or the softening range of the mixtures being between 30° and 150° C., preferably between 40° and 100° C. Compounds of the formula I are preferred.

A granulating auxiliary mixture usable according to the invention is for example a mixture of a compound of the formula I wherein A is the group

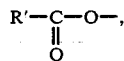

R' is an unsaturated, straight-chain hydrocarbon radical containing 8 to 22 carbon atoms, and n is 10 to 30, with urea, optionally in admixture with additives lowering the melting point; in particular a mixture of a condensation product from oleic acid with 20 mols of ethylene oxide with urea, optionally in admixture with additives lowering the melting point; or a mixture of a compound of the formula II, wherein x is 3, and m has the meaning given hereinbefore, with urea, optionally in admixture with additives lowering the melting point.

The dyes to be granulated are advantageously in dry form, for example as crude material, as spray-dried material, or as material dried in a conventional manner, for example as powder dried in a grinding dryer.

It is however also possible to mix and homogenise the synthesised solution or suspension or the press cake obtained from the dye production directly with the further additives, to optionally dry the mixture, and to subsequently spray it into the fluidised bed. The dye preparation and the pulverulent additives can also be simultaneously sprayed or fed into the fluidised bed. The granulating auxiliary can be added to the fluidised bed either separately or together with the liquid or pulverulent dye preparation. It is also possible to add the crude dye powder and the further additives separately to the fluidised bed.

The granulating auxiliary can be added in solid form to the dye powder, and subsequently heated together with the dye in the fluidised bed to a temperature above the softening point of the granulating auxiliary. It is however advantageous to add the melted granulating auxiliary to the fluidised bed, preferably by spraying.

There are advantageously used 5 to 50 parts, preferably 10 to 30 parts of the granulating auxiliary to 100 parts of the crude dye to be granulated.

It is furthermore of advantage when the particle size of all components is within a narrow range (for example 30 to 150 $\mu$m), in order to thus ensure a uniform grain build-up.

The granulates according to the invention are preferably produced by a continuous process in a fluidised bed installation, such as for example that described in the German Offenlegungsschrift No. 2,231,445, in which process the water-soluble dye is placed, optionally together with the said additives, into the fluidised bed, the granulating auxiliary, advantageously in the form of a melt, is then sprayed in, continuously or batchwise, and granular material is removed continuously or batchwise from the fluidised bed whilst this is being maintained by the passage through it of warm air, advantageously at about 5° to 10° C. above the softening point or range of the granulating auxiliary. The material removed in this manner is then preferably sifted, the coarse fractions with a diameter greater than 5 mm, optionally after particle-size reduction, and the fine fractions with a diameter less than about 0.1 mm being fed back, continuously or batchwise, to the fluidised bed. The particles having a size of between 0.1 to 2 mm constitute the preferred fraction of the preparation according to the invention, and are particularly suitable as dye preparations.

The process is suitable also for spray-dried powders, since there is obtained using this process an improvement in the dissolving (wetting) and free-flowing properties, and in particular an improvement in the behaviour with regard to release of dust and in the bulk density values, compared with those properties of the spray-dried material.

In a preferred embodiment, the melted granulating auxiliary or auxiliary mixture is finely sprayed continuously onto a fluidised bed consisting of the dye and optionally further additives. The process can however also be performed by the dry dye powder or the synthesised suspension or solution of the dye being continuously fed in, optionally together with further additives, whilst the granulating auxiliary, optionally liquified by heating, is being sprayed in or added in measured portions. The formed granulate is continuously taken from the fluidised bed with subsequent separation of the coarse and fine fractions; the fine fraction and the coarse fraction, optionally after particle-size reduction, are then returned to the fluidised bed.

The fluidised bed is produced by a stream of gas, which preferably has an inlet temperature of 35° to 300° C., the temperature in the fluidised bed advantageously being 50° to 100° C.

The fluidised-bed pressure difference (Δp) is preferably 50 to 150 mm water column (WC), and the flow rate is 0.5 to 3 meters per second.

The temperature difference (ΔT) in the fluidised bed is usually within the range of 5° to 15° C. The throughput can be adjusted to suit the type of apparatus and product. It is advantageous to use an apparatus having a sieve plate surface area of 2.5 m$^2$, which can be operated to give a continuous output of 100 to 400 kg of granulated product per hour. The given output is obtained by the addition of corresponding amounts of pulverulent starting product and granulating auxiliary to the fluidised bed.

There are obtained by the process of the invention low-dust to dust-free granulates which have a particle size of between 50 and 5000 μm, particularly between 100 and 2000 μm, and which are characterised by a uniform, dimensionally stable particle size and relatively high bulk density, by high mechanical strength, by their free-flowing characteristics and by their good dissolving properties, such as wetting and dispersibility, even in cold water. These granulates form no dust in particular during transport and when being processed, a property which they retain even during storage over several months, for example 6 to 12 months, at a temperature of −10° C. to +50° C.

The dye granulates according to the invention are particularly suitable for producing aqueous dye liquors and printing pastes, which can be used for dyeing and printing the widest variety of materials suitable for the respective class of dyes.

In the following Examples illustrating the invention, the term 'parts' denotes parts by weight, and temperature values are given in degrees Centigrade. The dyes are in the form of an alkali metal salt, particularly the sodium salt. With regard to the preparations, the term low dust signifies that virtually no particles less than 50 μm in size are present.

The following dust test is carried out to determine the behaviour with regard to release of dust:

A metal funnel having an internal diameter of 10 cm with a tube (internal diameter 15 mm) is placed onto a metal cylinder of 500 cm$^3$ capacity, the lower end of the tube extending down to the 200 cm$^3$ level of the cylinder. A pierced circular filter paper (Schleicher and Schüll LS14) is secured at the 400 cm$^3$ level of the cylinder, the filter paper being moistened with water to the extent that it is moderately moist but not dripping wet. 10 g of the substance to be tested are then poured quickly through the funnel; the funnel is taken out after 3 minutes, and the circular filter paper is removed by cutting. This filter paper is then assessed on the basis of a scale of ratings from 1 to 5 as follows:

rating 1=severe release of dust, when the circular filter paper is heavily shaded to deeply coloured;

rating 2=considerable release of dust, when the circular filter paper is slightly shaded;

rating 3=moderate release of dust, when the circular filter paper exhibits many specks of colour, some of which are in contact with each other;

rating 4=slight release of dust, when the circular filter paper exhibits spots of colour, none of which are connected with each other;

rating 5=negligible release of dust, when the circular filter paper exhibits a scarcely visible staining or at most scattered spots of colour.

The following test is carried out to determine the solubility of the dye granulates in cold water:

A specific amount (in g) of the dye granulate to be tested is added with stirring to 200 ml of desalted water at 20° C. in a 400 ml beaker, and stirring is maintained for 5 minutes (magnetic stirrer at 750 r.p.m.). The dye solution is then filtered through a filter paper (SS 1450 CV, diameter 7 cm), and the paper is rinsed with 50 ml of desalted water.

The solubility in cold water is expressed in terms of the highest concentration of dye in water which leaves no filter residue.

EXAMPLE 1

400 g of a homogeneous pulverulent mixture of the following composition are placed into a fluidised bed:

86 parts of the dye of the formula

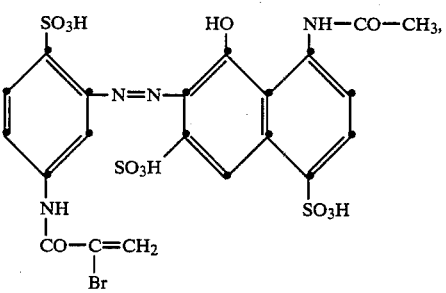

5 parts of sodium sulfate and
9 parts of dextrin.

Air at a temperature of 50°±5° is passed through the fluidised bed. A melt of the granulating auxiliary consisting of the condensation product formed from a commercial mixture of 45% of tetrahydroabietyl alcohol, 40% of dihydroabietyl alcohol and 15% of dehydroabietyl alcohol with about 100 mols of ethylene oxide (softening point about 45°) is then sprayed, from a nozzle fixed in the upper part of the turbulance chamber, onto the agitated fluidised bed. An agglomerating of the powder into the form of coarser agglomerates can be observed in the course of several minutes. The low-dust, free-flowing and dimensionally stable dye granulate produced in the manner described has the following particle-size distribution:

| particles | <50 μm | 1% |
|---|---|---|
| | 50 μm–2000 μm | 88% |
| | >2000 μm | 11%. |

The oversize particles (greater than 2000 μm) can be optionally reduced in size and taken off as good particles, or as a fine fraction (undersize, smaller than 50 μm) they can be fed back with the rest of the fine fractions to the fluidised bed.

| Further granulate data: | |
|---|---|
| bulk density (DIN 53,194) | 800 g/l |
| dust rating | 4 |
| solubility (g/l at 100°) | 80 |
| (g/l at 20°) | 20. |
| Composition of the final product: | |
| (390 g of good particles of 50 to 2000 μm particle size) | |
| about 10% of granulating auxiliary, | |
| about 77.5% of crude dye (including residual moisture), | |
| 4.5% of sodium sulfate, and | |
| 8% of dextrin. | |

EXAMPLE 2

A homogeneously mixed pulverulent mixture of the following composition is placed into a fluidised bed:

80 parts of the dye (including residual moisture) of the formula

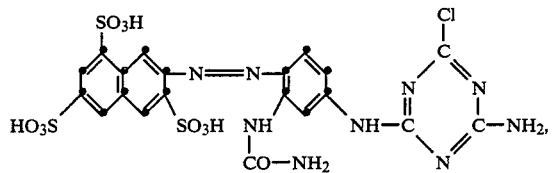

15 parts of the granulating auxiliary formed from the condensation product of oleyl alcohol with 80 mols of ethylene oxide (softening point 50°)

3 parts of a condensation product of naphthalenesulfonic acid and formaldehyde, and 2 parts of trisodium polyphosphate.

The fluidised bed is slowly heated by the feeding in of warm air (60°±5°) from the bottom. Agglomeration commences even during the heating phase, and as soon as the whole fluidised bed is in a good agglomerated (granulated) state, the granulate is removed from it. Further pulverulent mixture is now fed through a conveying tube into the centre of the fluidised bed, in order to operate the granulate production system continuously. For the purpose of maintaining the desired composition, the residual moisture in the granulate is optionally checked periodically or continuously by tests on the product taken from the fluidised bed.

The resulting low-dust, free-flowing and dimensionally stable dye granulate yielded the following data:

| Particle-size distribution | | |
|---|---|---|
| particles | <50 μm | 2% |
| | 50 μm–2000 μm | 78% |
| | >2000 μm | 20% |

The oversize particles can optionally be reduced in size and taken as good particles or as a fine fraction returned to the fluidised bed.

| Further granulate data | |
|---|---|
| bulk density | 720 g/l |
| dust rating | 4 |
| solubility (g/l at 100°) | 80 |
| (g/l at 20°) | 30. |

Equally good granulates having a high bulk density are obtained by using, instead of the granulating auxiliaries given in the above Examples, corresponding amounts of the granulating auxiliaries listed in the following Table A, with otherwise the same procedure.

TABLE A

| Example No. | Granulating auxiliary |
|---|---|
| 3 | condensation product from oleic acid and 20 mols of ethylene oxide |
| 4 | mixture of the condensation product from oleic acid and 20 mols of ethylene oxide and urea (mixture ratio 80:20) |
| 5 | condensation product from stearyl alcohol and 35 mols of ethylene oxide |
| 6 | polyvinylpyrrolidone and urea (20:80) |

EXAMPLES 7 TO 19

If the manner of procedure described in the preceding Examples 1 and 2 is followed except that the dyes used in this case are those given in the following Table B, there are obtained granulates having properties similar to those obtained in Examples 1 and 2.

TABLE B
| Example No. | Dye used |
|---|---|
| 7 | 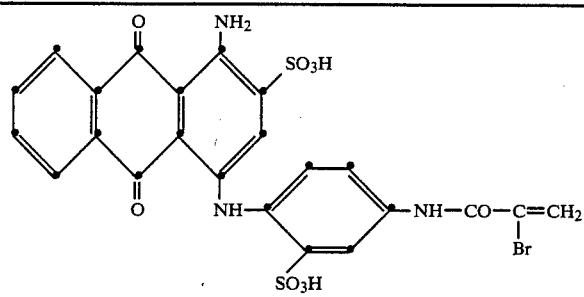 |
| 8 | 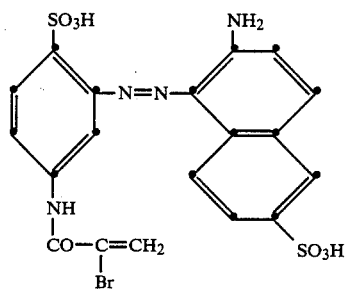 |
| 9 | 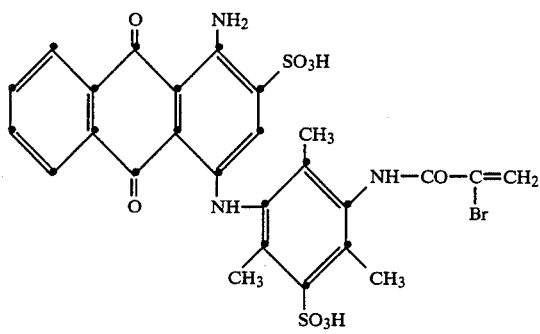 |
| 10 | 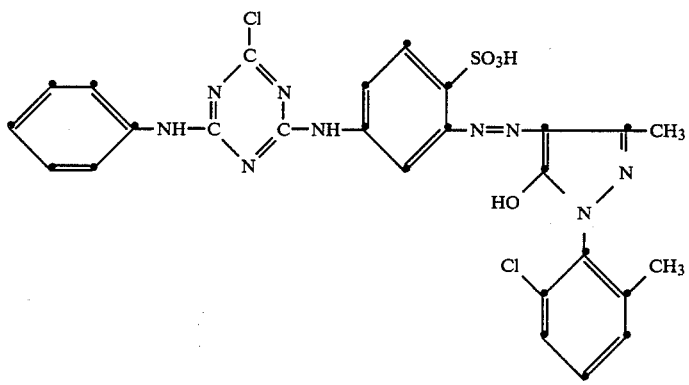 |
| 11 | 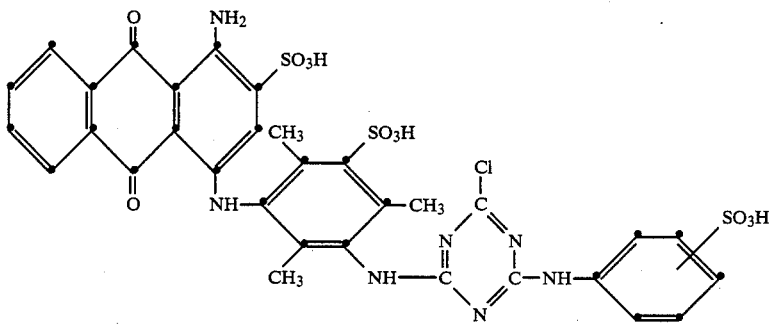 |

TABLE B-continued
| Example No. | Dye used |
|---|---|
| 12 | 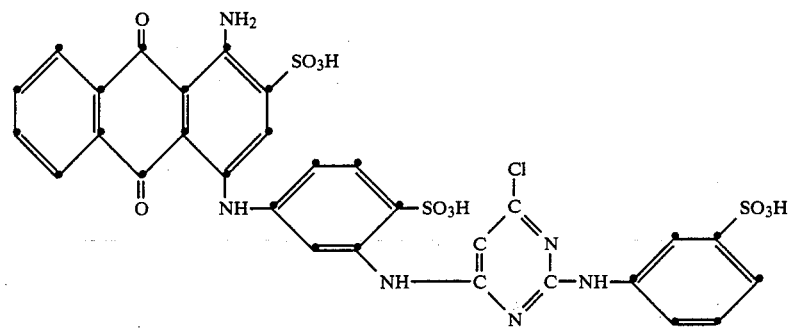 |
| 13 | 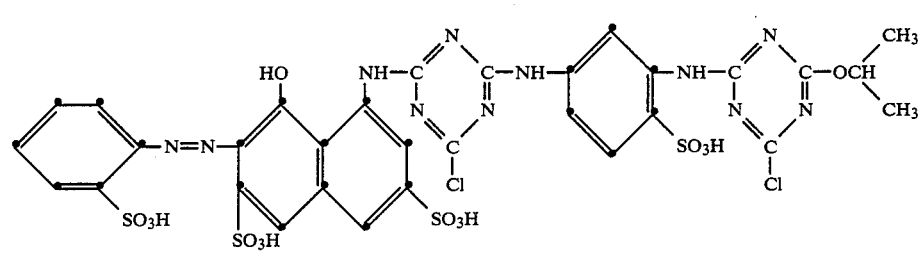 |
| 14 | 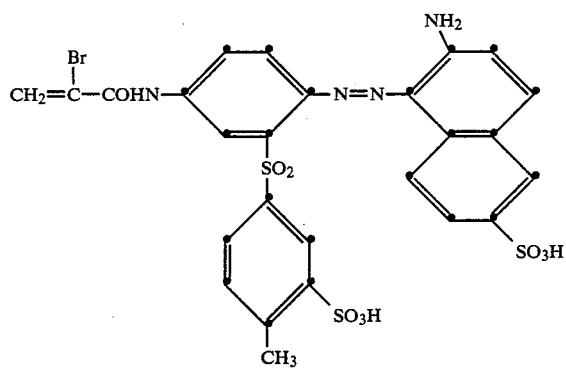 |
| 15 | 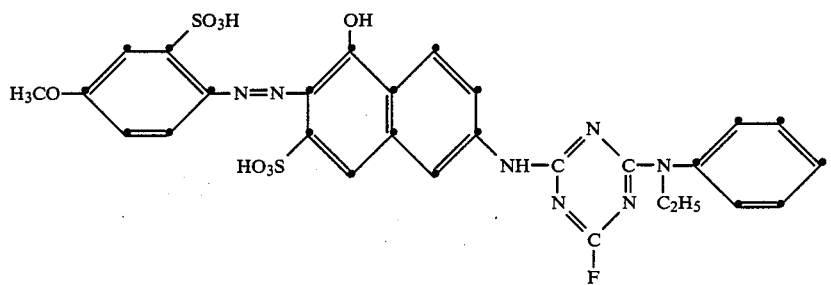 |
| 16 | 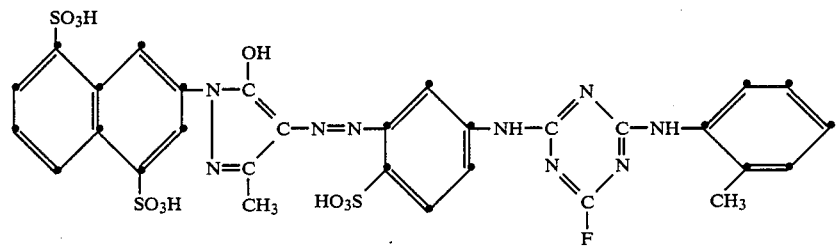 |

TABLE B-continued

| Example No. | Dye used |
|---|---|
| 17 | Structure: naphthalene-1,4-disulfonic acid–N=N–(methyl-phenyl)(O-Cu-O bridge)–N=N–(SO₃H-naphthyl)–N(CH₃)–C(=N-triazine with C-NH₂ and C-F) |
| 18 | Structure: naphthalene-1,5-disulfonic acid(SO₃H)–N=N–(HO, HO₃S-naphthyl with SO₃H)–NH–C(triazine N=N, C-F)–C–NH–C₆H₄–Cl |
| 19 | Structure: (SO₃H, HO₃S, SO₃H-naphthyl)–N=N–(NHCONH₂-phenyl)–NH–C(triazine with C-F)–C–NH–(CH₃-phenyl) |

EXAMPLES 20 TO 31

When the metal-complex dyes listed in the following Tables C to E are used instead of the dyes employed in the preceding Examples, the procedure otherwise being the same, there are obtained granulates having a similar composition and similar properties.

In Table C are listed 1:2-complexes which contain 2 molecules of the same dye bound in complex linkage with 1 metal atom.

TABLE C

| I Ex. No. | II Metal | III Dye | IV Shades on wool |
|---|---|---|---|
| 20 | Co | HO–(naphthyl with pyridine N ring)–N=N–(phenyl)–SO₃H | brown |
| 21 | Co | (phenyl with COOH)–NH–SO₂–(phenyl with OCH₃, O=C)–N=N–CH–C(=O)–HN–(Cl-phenyl) | yellow |

In Table D are listed 1:2-mixed complexes which contain 1 molecule of a dye of the column III and 1 molecule of a dye of column IV, bound in complex linkage with 1 metal atom of column II.

TABLE D

| I Ex. No. | II Metal | III Dye | IV Dye | V Shade on wool |
|---|---|---|---|---|
| 22 | Cr | (structure) | (structure) | navy blue |
| 23 | Fe | (structure) | (structure) | brown |
| 24 | Cr | (structure) | (structure) | black |
| 25 | Cr | (structure) | (structure) | green |
| 26 | Cr | (structure) | (structure) | green |

In Table E are listed 1:1-complexes which contain 1 molecule of the dye bound in complex linkage with 1 metal atom.

TABLE E

| I Ex. No. | II Metal | III Dye | IV Shade on wool |
|---|---|---|---|
| 27 | Fe | | brown |
| 28 | Cr | | blue |
| 29 | Cr | | orange |
| 30 | Ni | | turquoise blue |
| 31 | Cu | | turquoise blue |

Pc signifies phthalocyanine

What is claimed is:

1. A process for producing a granulate of water-soluble dyes, in which process at least one granulating auxiliary having a softening point or softening range of between 30° and 150° C. and selected from the group consisting of (a) at least one compound of the formula I $$A—(CH_2CH_2O)_n—H \qquad (I)$$

in which A is the group R—O— or

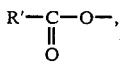

wherein R is an aliphatic or alicyclic hydrocarbon group having 8 to 22 carbon atoms, R' is an aliphatic hydrocarbon group having 8 to 22 carbon atoms, and n is 10 to 200, (b) a mixture of a compound of the formula II

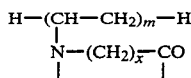 (II)

in which m is 50 to 500, and x is 3 to 5, with a compound of the formula III $R_1$—NH—CO—NH—$R_1$ (III)

in which each $R_1$ independently of the other is hydrogen or methyl, and (c) a mixture of a compound of the formula I with at least one compound of the formula II and III, is sprayed onto a fluidised bed containing at least one water-soluble dye and, the granulating auxiliary or both, the granulating auxiliary or auxiliary mixture being heated, before its addition, during the time it is in the fluidised bed or both, to above its softening point or softening range.

2. The process of claim 1, wherein the granulating auxiliary used is a eutectic mixture of at least two different compounds of the formula I, or a compound of the formula I with a compound of the formula II or III, or a mixture of a compound of the formula II with a compound of the formula III.

3. The process of claim 1, wherein the granulating auxiliary used is a compound of the formula I in which n is 20 to 150, and A, R and R' have the meanings defined in claim 1.

4. The process of claim 1, wherein the granulating auxiliary used is a compound of the formula I in which R is an aliphatic hydrocarbon group containing 8 to 22 carbon atoms, and A, R' and n have the meanings defined in claim 1.

5. The process of claim 1, wherein the granulating auxiliary used is a compound of the formula I in which A is the group R—O—, R is a straight-chain hydrocarbon group containing 8 to 22 carton atoms, and n is 35 to 80.

6. The process of claim 5, wherein the granulating auxiliary used is a compound of the formula I, in which A is the group R—O—, R is an unsaturated hydrocarbon group containing 18 carbon atoms, and n is 80.

7. The process of claim 5, wherein the granulating auxiliary used is a compound of the formula I, in which A is the group R—O—, R is a saturated hydrocarbon group containing 18 carbon atoms, and n is 35.

8. The process of claim 1, wherein the granulating auxiliary used is a compound of the formula I, in which A is the group R—O—, and R is an alicyclic hydrocarbon group containing 8 to 22 carbon atoms, and n has the meaning defined in claim 1.

9. The process of claim 8, wherein the granulating auxiliary used is a compound of the formula I, in which A is the group R—O—, R is an alicyclic hydrocarbon group containing 8 to 22 carbon atoms, and n is 100.

10. The process of claim 9, wherein the granulating auxiliary used is hydroabietyl alcohol, etherified with 100 mols of ethylene oxide.

11. The process of claim 1, wherein the granulating auxiliary used is a compound of the formula I in which A is the group

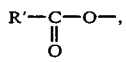

R' is an aliphatic straight-chain hydrocarbon group containing 8 to 22 carbon atoms, and n is 10 to 30.

12. The process of claim 11, wherein the granulating auxiliary of the formula I used is the condensation product from oleic acid and 20 mols of ethylene oxide.

13. The process of claim 1, wherein the granulating auxiliary used is a mixture of a compound of the formula I, in which A is the group

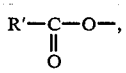

R' is an unsaturated, straight-chain hydrocarbon group containing 8 to 22 carbon atoms, and n is 10 to 30, with urea.

14. The process of claim 13, wherein the granulating auxiliary used is a mixture of a condensation product of oleic acid and 20 mols of ethylene oxide with urea.

15. The process of claim 1, wherein the granulating auxiliary used is a mixture of a compound of the formula II, in which x is 3, and m has the meaning defined in claim 1, with urea.

16. The process of claim 1, wherein the granulating auxiliary used has a softening point or softening range of between 40° and 100° C.

17. The process of claim 1, wherein the granulating auxiliary is used in an amount of from 5 to 50, preferably 10 to 30, percent by weight, relative to the dye.

18. The process of claim 1, wherein the further additives used are diluting agents, wetting agents, dispersing agents, anti-dust agents or mixtures thereof.

19. The process of claim 1, wherein the further additives are added in a total amount of from 0.1 to 50 percent by weight, relative to the granulate.

20. The process of claim 1, wherein water-soluble fibre reactive dyes are used.

21. The process of claim 1, wherein pulverulent dye, further additives or mixtures thereof are sprayed simultaneously with the granulating auxiliary into the fluidised bed.

22. The process of claim 1, wherein the fluidised bed is produced by a stream of gas, which has an inlet temperature of 35° to 300° C.

23. The process of claim 1, wherein the temperature in the fluidised bed is 50° to 100° C.

24. The process of claim 1, wherein the production is continuously maintained, the formulated dye particles which have a diameter greater than 5 mm and smaller than 0.1 mm being fed back, optionally after size reduction of the coarse fractions, directly to the fluidised bed.

25. The water-soluble dye granulate obtained by the process of claim 1.

26. The granulate of claim 25 containing a total of 5 to 50 percent by weight, relative to the dye, of at least one granulating auxiliary of the formula I, or of a mixture of at least two compounds of the formulae I, II or III.

27. The process of any one of claims 13, 14 and 15 wherein said granulating auxiliary is used in admixture with an additive which lowers the melting point.

* * * * *

UNITED STATES PATENT AND TRADEMARK OFFICE
CERTIFICATE OF CORRECTION

PATENT NO. : 4,560,747
DATED : December 24, 1985
INVENTOR(S) : Beat Bruttel, et al.

It is certified that error appears in the above-identified patent and that said Letters Patent is hereby corrected as shown below:

Col. 1, line 26  Correct spelling of "mechanical"

Col. 11, Ex. No. 12, under "Dye used"  End of structure delete " 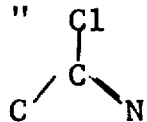 " and substitute:
-- 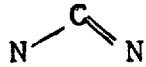 --

Col. 19, line 41  Delete "carton" and substitute --carbon--

Signed and Sealed this

Thirteenth Day of May 1986

[SEAL]

Attest:

DONALD J. QUIGG

Attesting Officer  Commissioner of Patents and Trademarks